(12) United States Patent  
Reyes et al.

(10) Patent No.: US 8,098,594 B2
(45) Date of Patent: Jan. 17, 2012

(54) DYNAMIC SIP MAX-HOP SETUP FOR IMS

(75) Inventors: Emerando M. Delos Reyes, Pleasent Hill, CA (US); Samir Ait-Ameur, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 12/482,074

(22) Filed: Jun. 10, 2009

(65) Prior Publication Data

US 2010/0316048 A1 Dec. 16, 2010

(51) Int. Cl.
*H04L 12/28* (2006.01)
*H04L 12/56* (2006.01)
*G06F 15/16* (2006.01)

(52) U.S. Cl. .................. 370/254; 370/389; 709/227

(58) Field of Classification Search .............. 370/389, 370/254, 400; 709/227
See application file for complete search history.

(56) References Cited

U.S. PATENT DOCUMENTS

| 7,551,608 | B1* | 6/2009 | Roy .................. 370/352 |
| 7,681,038 | B1* | 3/2010 | Dawson et al. ........... 713/168 |
| 2005/0220106 | A1* | 10/2005 | Raverdy et al. ........... 370/392 |
| 2005/0237952 | A1* | 10/2005 | Punj et al. ................ 370/260 |
| 2007/0022289 | A1* | 1/2007 | Alt et al. .................. 713/168 |
| 2008/0002820 | A1* | 1/2008 | Shtiegman et al. ....... 379/211.02 |
| 2008/0279119 | A1* | 11/2008 | Stille et al. ............... 370/261 |
| 2009/0013078 | A1* | 1/2009 | Bencheikh ................. 709/227 |
| 2009/0043898 | A1* | 2/2009 | Xin et al. .................. 709/228 |
| 2009/0245492 | A1* | 10/2009 | Baker et al. .............. 379/112.01 |

* cited by examiner

*Primary Examiner* — Ayaz Sheikh
*Assistant Examiner* — Hoang-Chuong Vu (57) ABSTRACT

A device forwards in a network, a session setup request from an originating user device toward a destination user device and intercepts a too many hops error message from a network element to the originating user device. The device also automatically sends, in response to the error message, a search request message to determine a correct number of hops from the originating user device to the destination user device and resets a Max-Forwards value for the session setup request based on the determined correct number of hops. The session setup request with the determined correct number of hops may be resent on behalf of the originating device without the too may hops error ever reaching the originating device.

20 Claims, 7 Drawing Sheets

DYNAMIC SIP MAX-HOP SETUP FOR IMS

BACKGROUND

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between two of the most successful communication paradigms, cellular and Internet technology, by providing Internet services everywhere using cellular technology in a more efficient way.

Session Initiation Protocol (SIP) is the main protocol for IMS. SIP is an application-layer control (e.g., signaling) protocol for creating, modifying, and terminating sessions with one or more participants. These sessions may include Internet-based telephone calls, multimedia distribution, multimedia conferences, instant messaging conferences, interactive voice response (IVR) sessions, automated and manual operator services, automatic call distribution, call routing, etc. SIP invitations or INVITES may be used to create sessions and may carry session descriptions that allow participants to agree on a set of compatible media types. SIP may use proxy servers to help route requests to a user's current location, authenticate and authorize users for services, implement provider call-routing policies, and/or provide other features to users.

SIP enforces a limit on the maximum number of hops that a session setup request may traverse on the way to its destination. As defined by the Internet Engineering Task Force's (IETF) Request for Comments (RFC) 3261 (Section 20.22), the maximum number of hops is limited based on a value included in an SIP request header in a field called "Max-Forwards." The value of the Max-Forwards field decrements each time the session setup request is forwarded to the next SIP proxy server. When a SIP proxy server receives a request containing a Max-Forwards value equal to zero, it returns a "483—too many hops error" response to indicate that the next hop limit was exhausted. The SIP proxy server then ends the request; hence failing the SIP session setup.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Systems and/or methods described herein may prevent a SIP call request failure due to a too many hops error (e.g., a SIP "483—too many hops error" or "483 error") resulting from a SIP Max-Forwards header reaching the value of 0 (zero). In implementations described herein, an IMS SIP max-hop redirector (I-SMHR) may intercept a "483 error" message, compute the required hop count, and dynamically reconfigure the Max-Forwards header to prevent failure of a SIP session setup request. The I-SMHR may also optimize the flow of subsequent SIP session setup requests by storing the optimum value of the max hop count required for a SIP session setup request to reach its destination.

Figure 1:
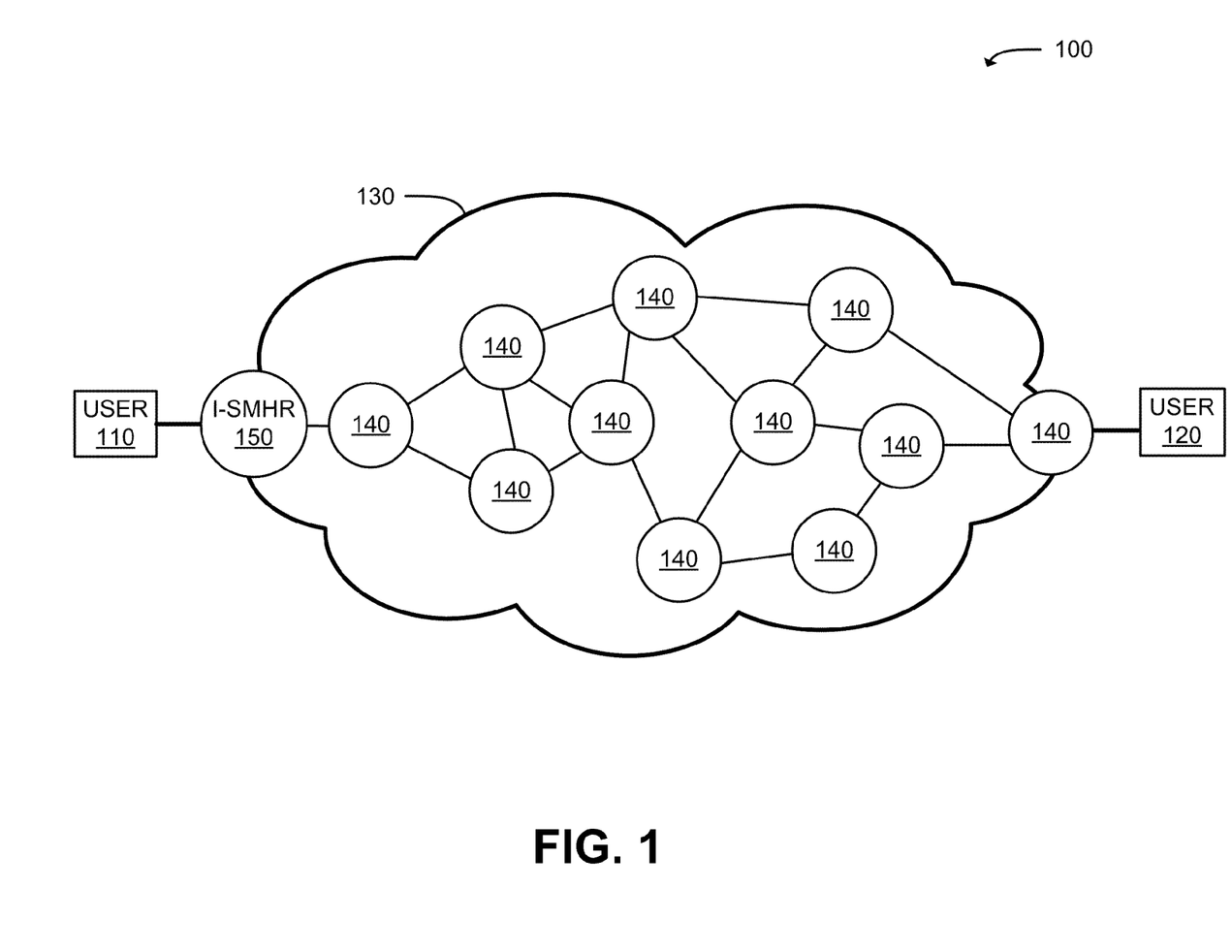
FIG. 1 is a diagram of an exemplary network in which systems and/or methods described herein may be implemented.

FIG. 1 provides a diagram of an exemplary network 100 in which systems and/or methods described herein may be implemented. As shown in FIG. 1, network 100 may include a originating user device 110 and destination user device 120 connected by an IMS SIP network 130 that facilitates communication between originating user device 110 and terminating user device 120. IMS SIP network 130 may include multiple network elements 140 (referred to herein individually as "network element 140") and an IMS SIP max-hop redirector (I-SMHR) 150. For simplicity, one originating user device 110, one destination user device 120, one IMS SIP network 130, one I-SMHR 150, and several network elements 140 have been illustrated in FIG. 1. In practice, there may be more originating user devices, destination user devices, IMS SIP networks, and/or I-SMHRs, and more or fewer network elements. Also, in some instances, one or more of the components of network 100 may perform one or more functions described as being performed by another one or more of the components of network 100.

Originating user device 110 may include a SIP-based device. Destination user device 120 may be similarly configured. For example, originating user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a voice-over-IP (VoIP)-based device, or other types of computation or communication devices, threads or processes running on these devices, and/or objects executable by these devices. In some implementations, originating user device 110 may include a user agent that has instructions for causing originating user device 110 to implement SIP signaling on behalf of originating user device 110. In doing so, the user agent may include instructions to cause originating user device 110 to assign a port number for a SIP session, such as a call between originating user device 110 and destination user device 120. The user agent may create, modify, or terminate sessions with participants of the session, such as destination user device 120.

IMS SIP network 130 may include a SIP-based local area network (LAN), a SIP-based wide area network (WAN), a SIP-based metropolitan area network (MAN), a SIP-based intranet, the Internet, a VoIP-based network, or a combination of SIP-based networks. IMS SIP network 130 may generally be operable according to the standards defined by the 3GPP and to allow service providers to manage a variety of services that can be delivered via IP over any network type, where IP is used to transport both bearer traffic and SIP-based signaling traffic. IMS SIP network 130 may include multiple layers (e.g., a services/application layer, an IMS layer, and a transport layer) that include a variety of network elements to deliver applications and/or services for use by user devices 110/120. Exemplary services may include caller identification (ID)-related services, call waiting, call holding, push-to-talk, conference call services, voicemail, instant messaging, call blocking, and call forwarding.

Network element 140 may include a device, such as a SIP proxy server or gatekeeper, that facilitates the establishment of SIP calls. A "SIP call" may include any out-of-dialog or dialog-establishing SIP method (e.g., a SIP INVITE request or message, a SIP SUBSCRIBE request, a SIP REFER request, a SIP OPTIONS request, a SIP MESSAGE request, a SIP REGISTER request, etc.). Network element 140 may act as both a server and a client for the purpose of making requests on behalf of other clients. Network element 140 may service requests internally or pass them on, possibly after translation, to other servers. Network element 140 may interpret, and, if necessary, rewrite a request message before forwarding it.

In one example, certain network elements 140 may be owned and/or managed by a particular carrier that is different than the carrier that owns and/or manages other certain network elements 140. Network elements 140 may further include one or more gateways. For example, network elements 140 may include gateways to interface IMS SIP network 130 with parts of a wired network, such as the public switched telephone network (PSTN).

I-SMHR 150 may include may include one or more servers, or other types of computation or communication devices, that gather, process, search, and/or provide information in a manner described herein. In one implementation, I-SMHR 150 may include a server (e.g., a computer system) with multiple modules to optimize and prevent a SIP session setup from failing to establish the call setup. In an exemplary implementation, I-SMHR 150 may be deployed within one or more network elements 140 or within another node of IMS SIP network 130. I-SMHR 150 may be implemented as a single server device or I-SMHR 150 may be a distributed system. As described further herein, I-SMHR 150 may intercept a SIP "483—too many hops error" message, compute the required hop count value, and dynamically reconfigure the Max-Forwards header of a SIP request to prevent a SIP request failure. In another implementation, I-SMHR 150 may store the calculated hop count value for a particular SIP request to optimize the flow of subsequent SIP call requests. I-SMHR 150 is described in more detail with respect to, for example, FIGS. 3 and 4.

In an error-free operation of network 100, originating user device 110 may send a SIP session setup request through IMS SIP network 130 to initiate a SIP call with destination user device 120. The SIP session setup request and other messages exchanged within network 100 may be in the form of a packet of data having both header and payload information. Most forms of signaling information (e.g., next hop information, Max-Forwards values, and error codes) may be contained in packet headers, while information relating to the media being exchanged between originating user device 110 and destination user device 120 may typically be contained within the payload portion.

The SIP session setup request from originating user device 110 may be initially received at I-SMHR 150, which forwards the SIP session setup request toward destination user device 120 via network elements 140. In response to the received SIP session setup request, destination user device 120 may send a response message having a similar session description portion to originating user device 110 via network elements 140 and I-SMHR 150. When originating user device 110 receives the response message, originating user device 110 may forward an acknowledgement message to destination user device 120. This acknowledgement message may complete the SIP call setup and enable subsequent exchange of real-time media directly between the originating user device 110 and destination user device 120.

Figure 2:
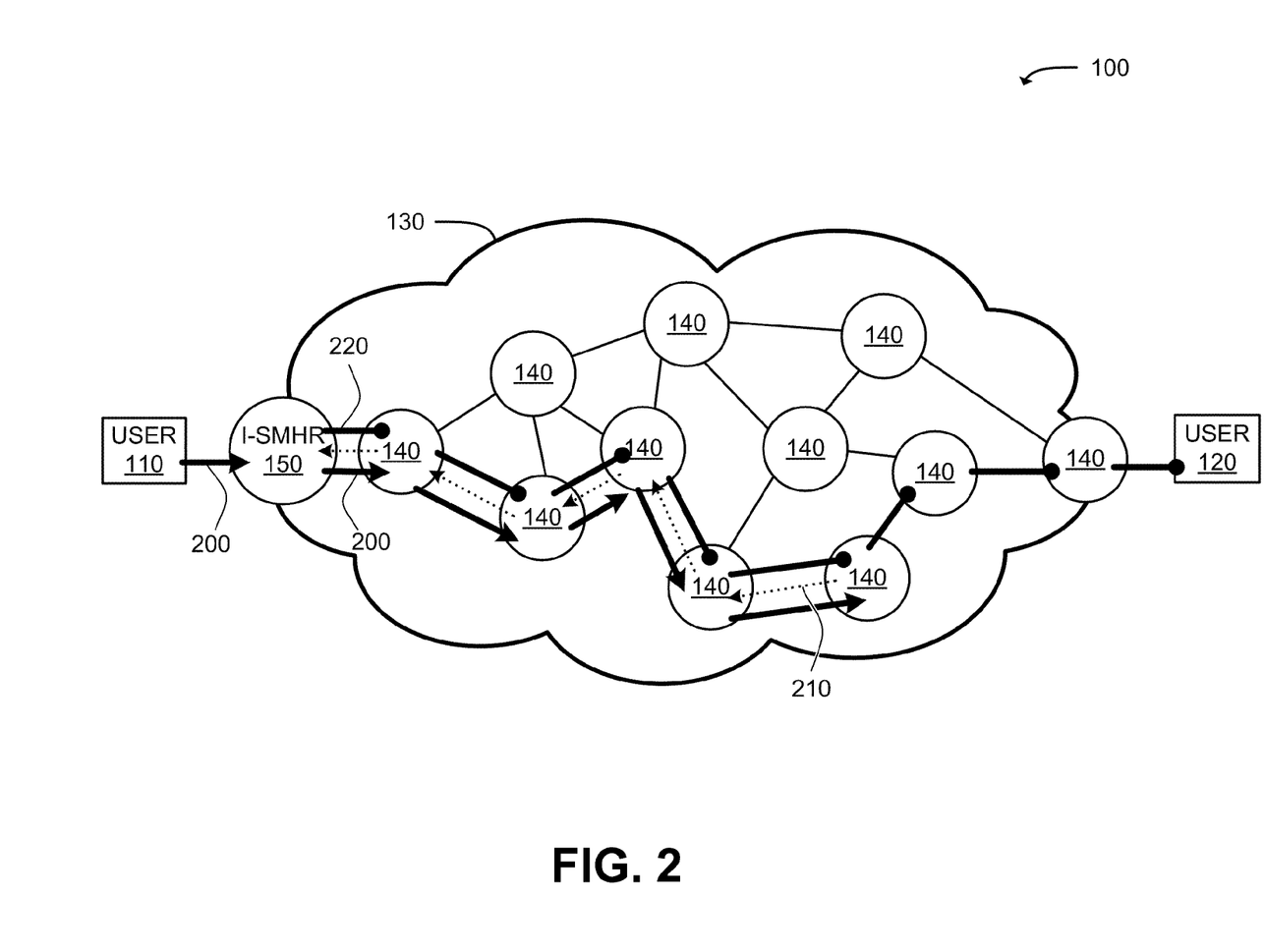
FIG. 2 depicts a diagram of exemplary interactions among components of the network illustrated in FIG. 1.

FIG. 2 provides a diagram of exemplary interactions among components of network 100 when a SIP "483—too many hops" error occurs. As shown, originating user device 110 may send a SIP session setup request 200 to destination user device 120. I-SMHR 150 may receive SIP session setup request 200 from originating user device 110 and may forward SIP session setup request 200 toward destination user device 120 via selected network elements 140 in SIP network 130. After the SIP session setup request 200 is forwarded to SIP network 130, I-SMHR 150 can monitor SIP session setup request 200 and wait for a response from destination user device 120.

As further shown in FIG. 2, a SIP response 210 may be provided to I-SMHR 150. SIP response 210 may be associated with destination user device 120 and may contain SIP "483—too many hops" error, indicating that the value on the Max-Forwards field of SIP session setup request 200 reached 0 (zero) before SIP session setup request 200 reached destination user device 120. I-SMHR 150 may then initiate a search request to destination user device 120 to determine the number of hop counts necessary to reach destination user device 120. Once I-SMHR 150 determines the number of hop counts required to reach destination user device 120, I-SMHR 150 may then reset the value of the Max-Forwards field of SIP session setup request 200 based on the information obtained from the search request. I-SMHR 150 can then re-initiate SIP session setup request 200 as a SIP session setup request 220 on behalf of originating user device 110. I-SMHR 150 may store the new value of the Max-Forwards field for future use. For example, the next time I-SMHR 150 receives a SIP session setup request towards the same destination user device 120, I-SMHR 150 can automatically substitute the proper Max-Forwards value of the SIP request with the stored value.

Figure 3:
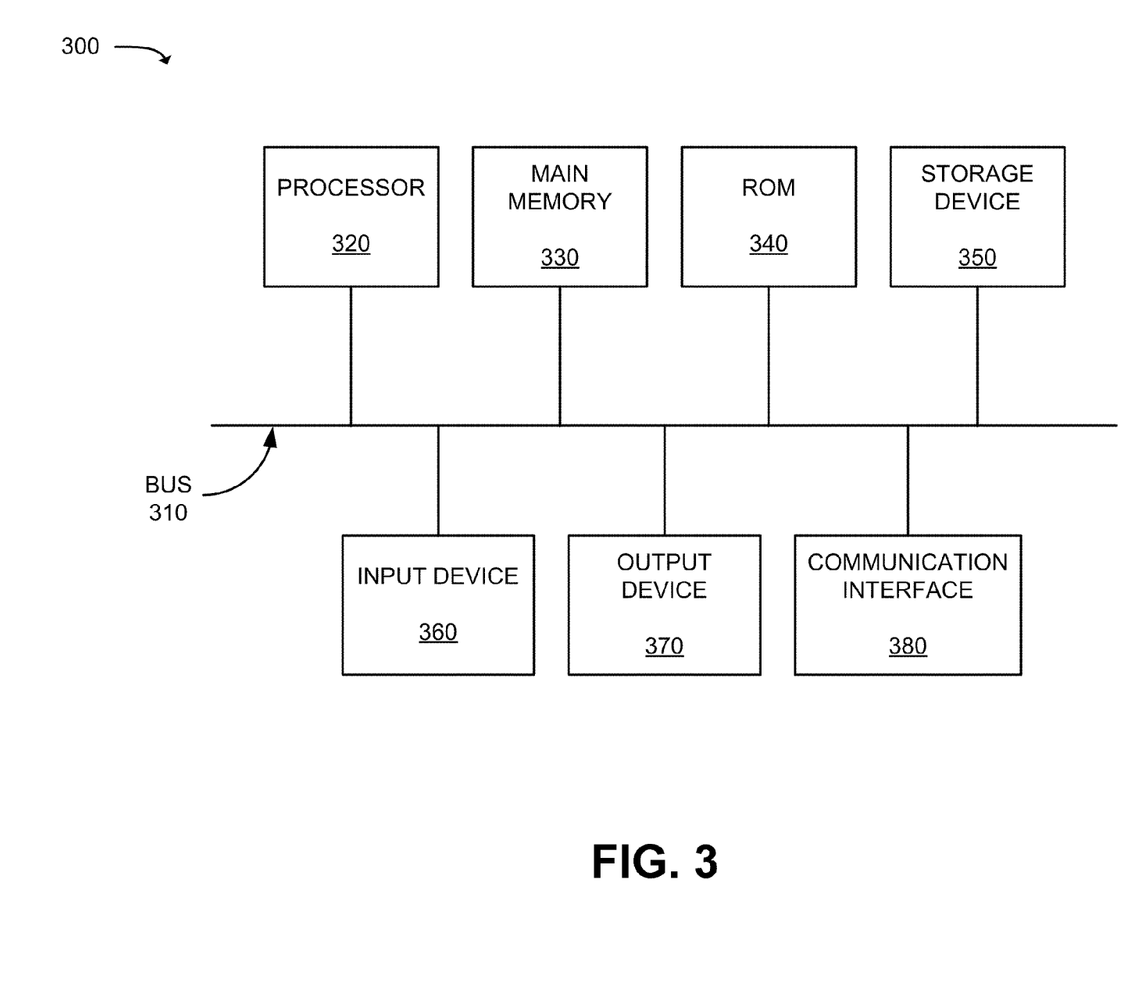
FIG. 3 illustrates exemplary components of network elements and/or an IMS SIP max-hop redirector of the network depicted in FIGS. 1 and 2.

FIG. 3 provides an exemplary diagram of a device 300 that may correspond to network elements 140 and/or I-SMHR 150. As illustrated, device 300 may include a bus 310, a processor 320, a main memory 330, a read-only memory (ROM) 340, a storage device 350, an input device 360, an output device 370, and/or a communication interface 380. Bus 310 may include a path that permits communication among the components of device 300.

Processor 320 may include one or more processors, microprocessors, or other types of processing devices that may interpret and execute instructions. Main memory 330 may include one or more random access memories (RAMs) or another type of dynamic storage device that may store information and instructions for execution by processor 320. ROM 340 may include one or more ROM devices or another type of static storage device that may store static information and/or instructions for use by processor 320. Storage device 350 may include one or more magnetic and/or optical recording media and their corresponding drives.

Input device 360 may include one or more mechanisms that permit an operator to input information to device 300, such as a keyboard, a mouse, a pen, a microphone, voice recognition and/or biometric mechanisms, etc. Output device 370 may include one or more mechanisms that output information to the operator, including a display, a printer, a speaker, etc. Communication interface 380 may include any transceiver-like mechanisms that enable device 300 to communicate with other devices and/or systems. For example, communication interface 380 may include mechanisms for communicating with another device or system via a network, such as network 150.

As described herein, device 300 may perform certain operations in response to processor 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
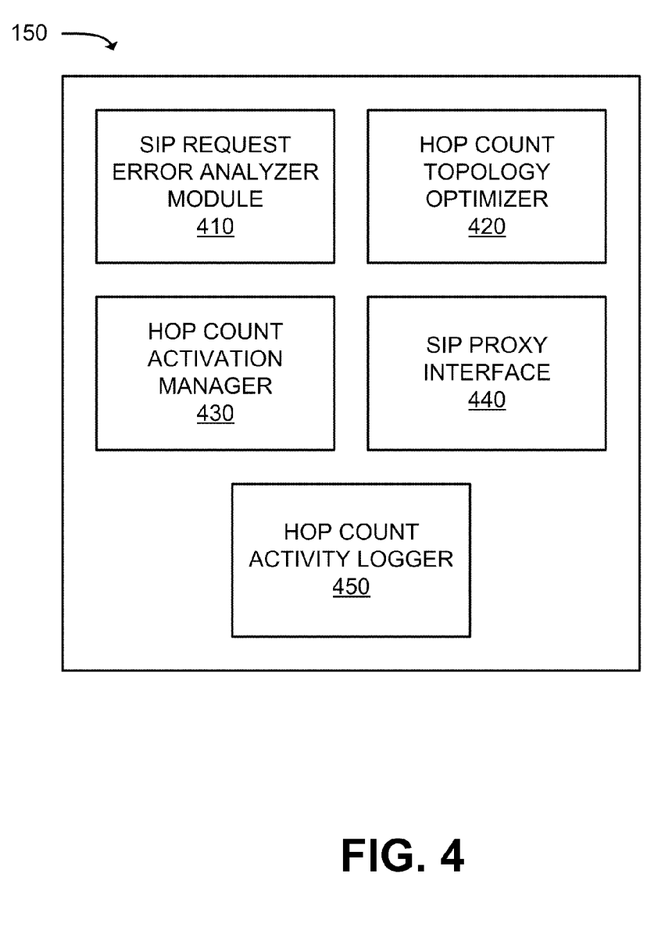
FIG. 4 depicts a diagram of exemplary functional components of the IMS SIP max-hop redirector of FIGS. 1 and 2.

FIG. 4 depicts a diagram of exemplary functional components of I-SMHR 150. As shown in FIG. 4, I-SMHR 150 may include a SIP request error analyzer module 410, a hop count topology optimizer 420, a hop count activation manager 430, a SIP proxy interface 440, and a hop count activity logger 450. In one implementation, SIP request error analyzer module 410, hop count topology optimizer 420, hop count activation manager 430, SIP proxy interface 440, and hop count activity logger 450 may be implemented within processor 320 and/or memory 330 of I-SMHR 150.

SIP request error analyzer module 410 may include hardware or a combination of hardware and software to analyze SIP error types and sources. SIP request error analyzer module 410 may categorize the frequency of the SIP errors along with their source, destination and the preconfigured hop count limit number found in the Max-Forwards field.

Hop count topology optimizer 420 may include hardware or a combination of hardware and software to receive analyzed data from SIP request error analyzer module 410 and streamline different optimal paths based on the location and layout of the nearest network elements 140. Hop count topology optimizer 420 may, for example, assemble an optimal path table to track the optimal paths from I-SMHR 150 to each destination. In one implementation, hop count topology optimizer 420 may initiate a request ping to the intended destination to determine the number of hop counts necessary to reach the destination. Hop count topology optimizer 420 may then increment the limit value initially found in the Max-Forwards field to the missing hop count number required to successfully complete the SIP session setup request. In one implementation, hop count topology optimizer 420 may periodically update the stored hop counts and optimal paths, and reserve at least one optimal SIP setup path on standby in case a failure occurs.

Hop count activation manager 430 may include hardware or a combination of hardware and software to receive SIP session requests from hop count topology optimizer 420 with the appropriate Max-Forwards value and to process the SIP session setup request by forwarding the SIP session setup request to next SIP proxy. The optimal path table may be provided to hop count activation manager 430 by hop count topology optimizer 420.

SIP proxy interface 440 may include an adaptive interface to any non-standard network element 140, such as a non-standard proxy server. SIP proxy interface 440 may allow hop count activation manager 430 to forward the SIP session setup request with the revised hop count (if applicable) to the next network element 140 along the optimal path.

Hop count activity logger 450 may include hardware or a combination of hardware and software to store and process all SIP error messages that might occur during the SIP setup process for a particular SIP call. Hop count activity logger 450 may check if the same error type "483" occurred during a SIP session setup, and, if so, hop count activity logger 450 may feed the error message back to SIP request error analyzer module 410 for reprocessing in order to successfully complete the SIP session setup.

Although FIG. 4 shows exemplary functional components of I-SMHR 150, in other implementations, I-SMHR 150 may contain fewer, different, differently-arranged, or additional functional components than depicted in FIG. 4. In still other implementations, one or more functional components of I-SMHR 150 may perform one or more other tasks described as being performed by one or more other functional components of I-SMHR 150.

Figure 5:
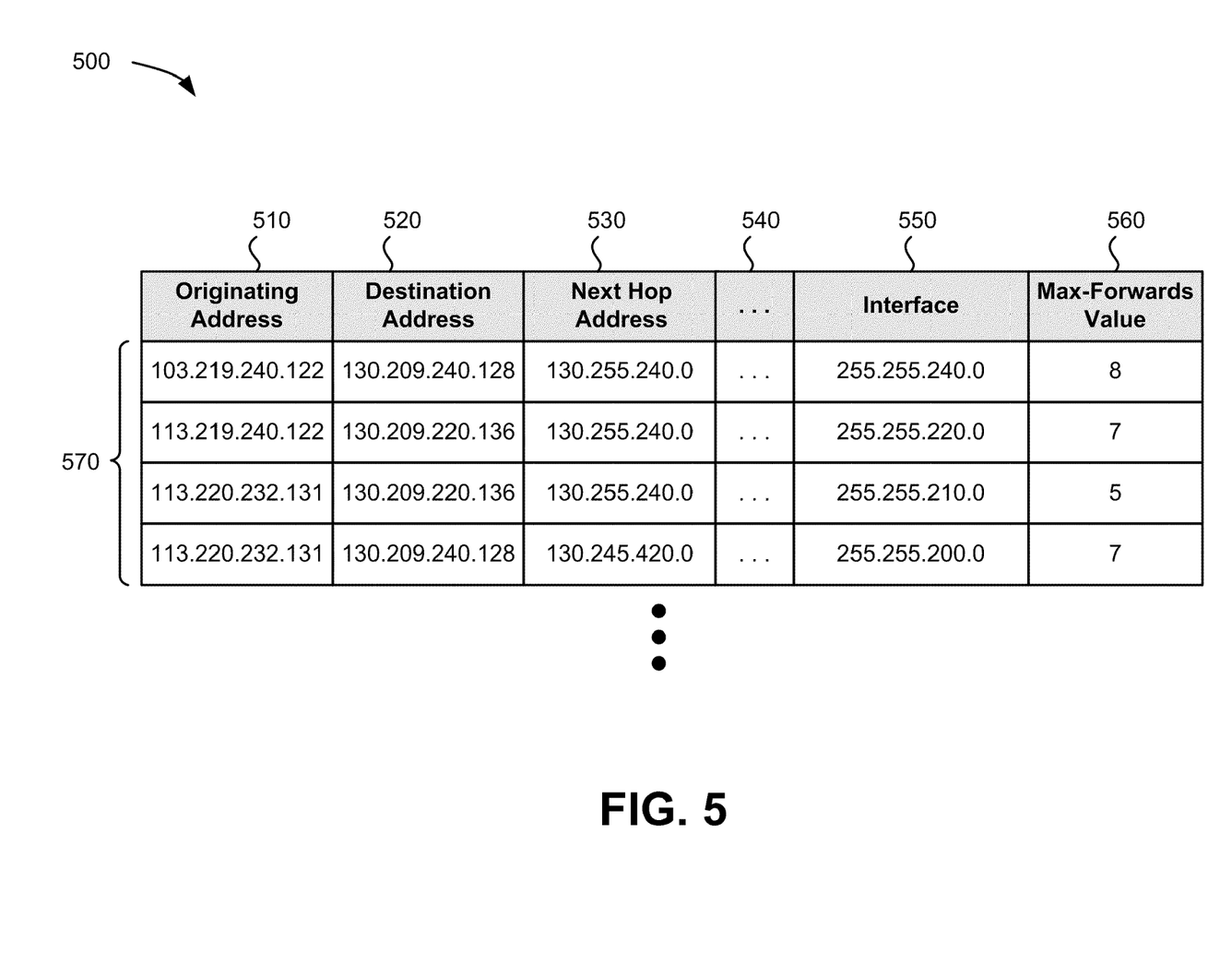
FIG. 5 depicts portions of an exemplary data structure that may be stored in the IMS SIP max-hop redirector.

FIG. 5 depicts portions of an exemplary data structure 500 that may be stored in I-SMHR 150. Data structure 500 may be used by I-SMHR 150 to confirm and/or correct the Max-Forwards value for a SIP setup request from a particular originator to a particular destination. Data structure 500 may be implemented in a single database, in multiple databases, or as separate tables.

As illustrated in FIG. 5, data structure 500 may include a variety of information associated with a SIP setup request. For example, data structure 500 may include an originating address field 510, a destination address field 520, a next hop address field 530, an additional information field 540, an interface field 550, a max-forward value field 560, and a variety of records or entries 570 associated with fields 510-560.

Originating address field 510 may include an IP address, URI, or other indicator for an originating user agent, such as originating user device 110. Destination address field 520 may include an IP address, URI or other indicator for the destination of a SIP session request, such as destination user device 120.

Next hop address field 530 may include an IP address to which any packet trying to reach the address in destination address field 520 should be sent. Additional information field 540 may include one or more fields that store additional information to optimize the flow of subsequent SIP session requests. Additional information field 540 may include, for example, best path information for the address in destination address field 520.

Interface field 550 may include an IP number of a network interface (e.g., SIP proxy interface 440) of I-SMHR 150 on which a packet (e.g., an SIP setup request) trying to reach the address in destination address field 520 should be forwarded. Max-forwards value field 560 may include a number of hops to the address in destination address field 520. Max-forwards value field 560 may be determined, for example, by hop count topology optimizer 420 of I-SMHR 150.

Although FIG. 5 shows exemplary information that may be provided in data structure 500, in other implementations, data structure 500 may contain less, different, differently-arranged, or additional information than depicted in FIG. 5.

Figure 6:
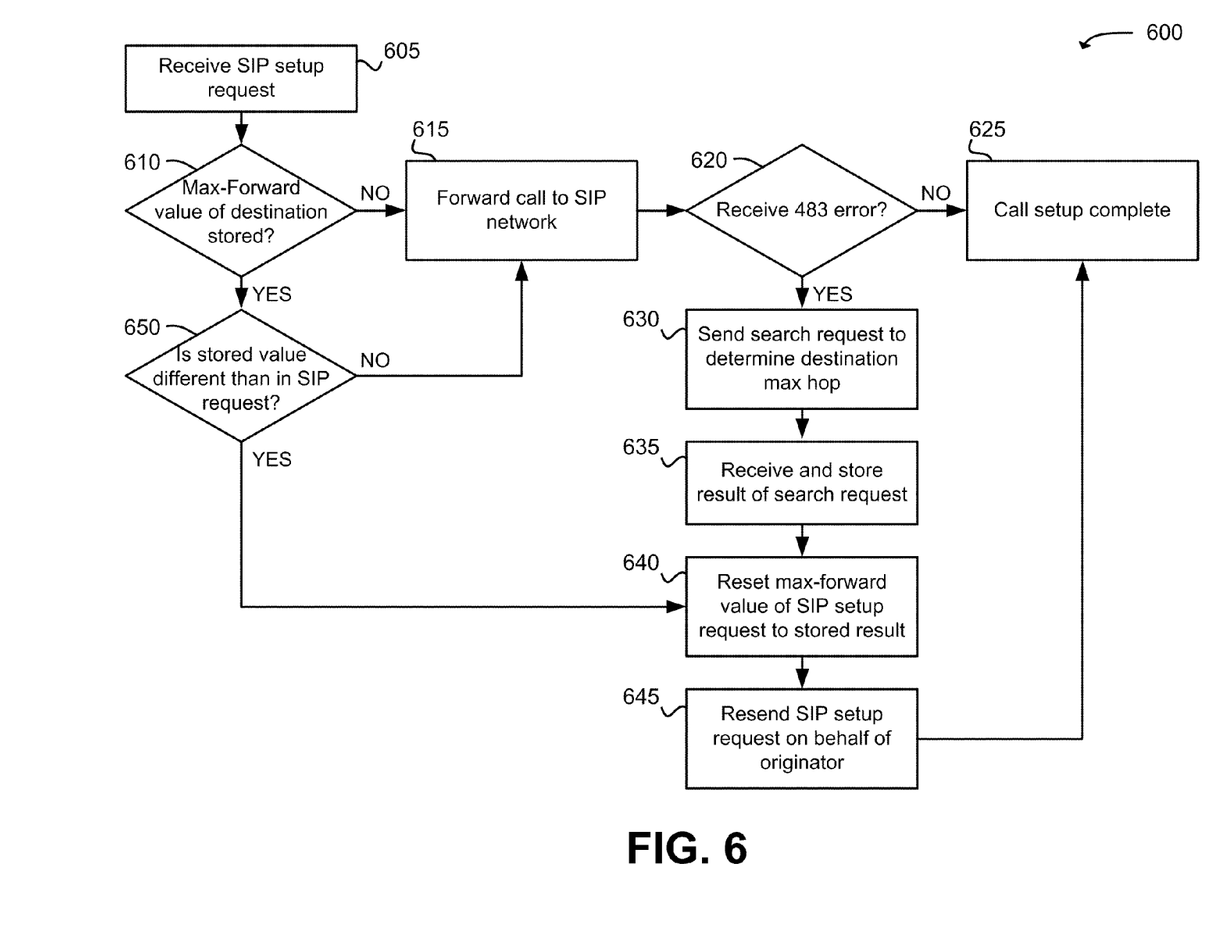
FIG. 6 is a flow diagram illustrating an exemplary process for managing a "483—too many hops error" during a SIP call request.

FIG. 6 depicts a flow diagram illustrating an exemplary process 600 for managing a "483—too many hops error" during a SIP call according to implementations described herein. In one implementation, process 600 may be performed by I-SMHR 150. In another implementation, some or all of process 600 may be performed by another device or group of devices, including or excluding I-SMHR 150.

As illustrated in FIG. 6, process 600 may begin with receiving a SIP setup request (block 605) and determining if a max-forwards value of a destination is stored (block 610). For example, I-SMHR 150 may receive a SIP setup request from originating user device 110. I-SMHR 150 (e.g., hop count topology optimizer 420) may then determine if a max-forwards value of the destination user agent (UA) identified in the SIP request is stored in a memory (e.g., table 500 of memory 330). The destination UA may be included in destination user device 120.

If a max-forwards value for the destination is not stored (block 610—NO), then the call may be forwarded to a SIP network (block 615). For example, I-SMHR 150 (e.g., SIP proxy interface 440) may forward the SIP request to the next network element 140 for processing through IMS SIP network 130.

It may be determined if a 483 error is received (block 620). For example, I-SMHR 150 (e.g., SIP request error analyzer module 410) may monitor the SIP call and intercept responses from the destination UA or from intervening network devices 140. I-SMHR 150 (e.g., SIP request error analyzer module 410) may screen the responses for any "483—too many hops error" messages. If a 483 error is not received (block 620—NO), a SIP session setup may be complete (block 625). For example, I-SMHR 150 (e.g., SIP request error analyzer module 410) may no longer monitor SIP traffic relating to the established SIP session if a 483 error is not received.

If a 483 error is received (block 620—YES), a search request may be sent to determine a max hop count for the destination (block 630). For example, I-SMHR 150 (e.g., hop count topology optimizer 420) may initiate a search request (e.g., a request ping) to the destination UA to determine the number of hop counts necessary to reach the destination UA.

A response from the destination UA may be received and stored (block 635). For example, I-SMHR 150 (e.g., hop count topology optimizer 420) may receive a response from the destination UA and store the correct max-forwards value in table 500.

The max-forward value of the SIP request may be reset to the stored result (block 640). For example, I-SMHR 150 (e.g., hop count activation manager 430) may revise the max-forwards value for the SIP request to match the value stored in table 500.

The SIP request may be resent on behalf of the originator (block 645). For example, I-SMHR 150 (e.g., SIP proxy interface 440 may) may send the SIP request with the correct max-forwards value to the destination UA.

Once the corrected SIP request is sent, the call setup may be completed (block 625). I-SMHR 150 may, thus, resolve the "483—too many hops error" message without intervention from the originating UA (e.g., user device 110) or intervention from a network administrator.

Returning to block 610, if a max-forwards value for the destination is stored (block 610—YES), then it may be determined if the stored value is different than the max-forward value in the SIP request (block 650). For example, I-SMHR 150 (e.g., SIP request error analyzer module 410) may compare the max-forward value contained in the SIP request with the max-forward value stored in memory 330 (e.g., table 500). If the stored value is not different than the max-forward value in the SIP request (block 650—NO), the call may be forwarded to the SIP network (block 615) and process 600 may continue from block 615 as described above. If the stored value is different than the max-forward value in the SIP request (block 650—YES), the max-forward value of the SIP request may be reset to the stored result (block 640) and process 600 may continue from block 640 as described above.

Figure 7:
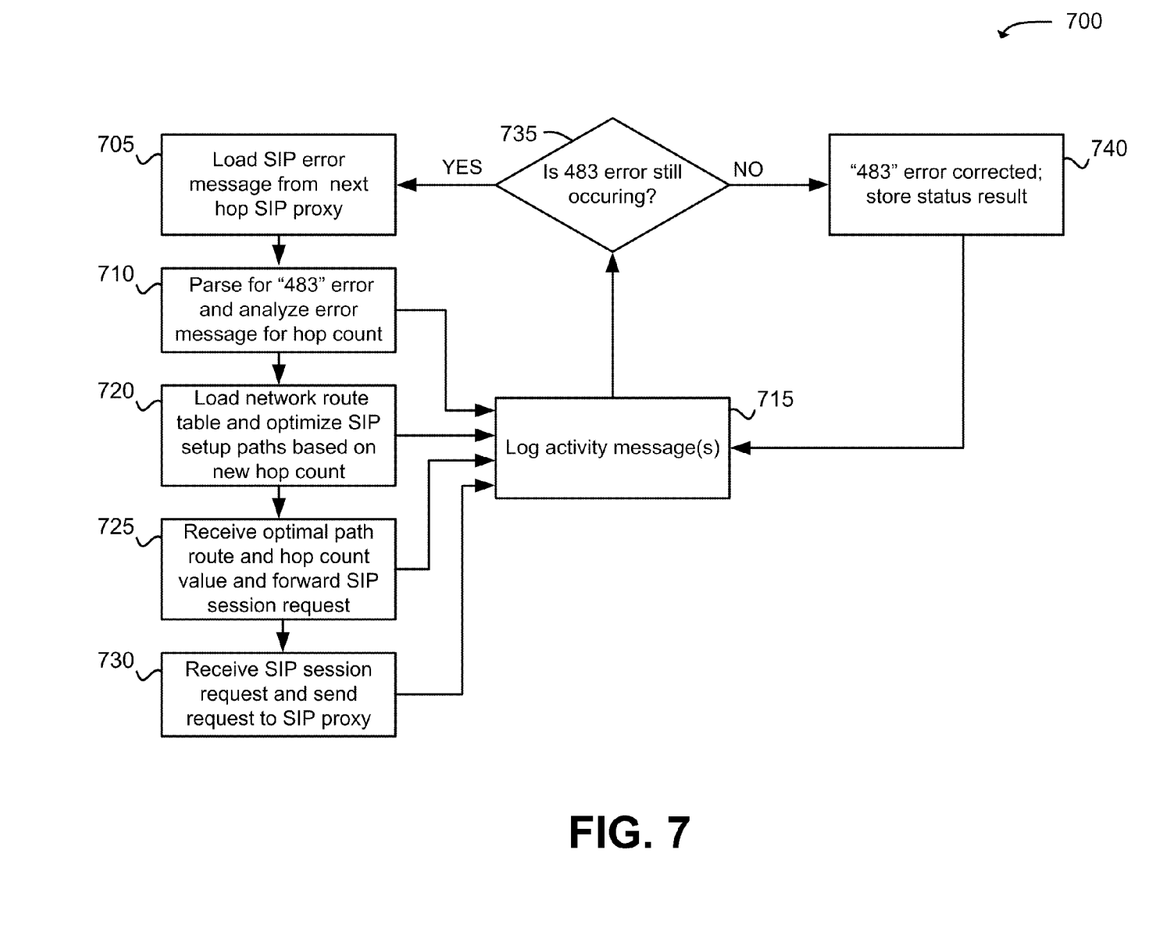
FIG. 7 is a flow diagram illustrating an exemplary process for processing a SIP error message.

FIG. 7 is a flow diagram illustrating an exemplary method 700 for processing a SIP error message. In one implementation, process 700 may be performed by I-SMHR 150. In another implementation, some or all of process 700 may be performed by another device or group of devices, including or excluding I-SMHR 150.

Process 700 may begin with loading a SIP error message received from a next hop proxy server (block 705). For example, I-SMHR 150 (e.g., SIP request error analyzer module 410) may receive a SIP error message from an adjacent network element 140.

The error message maybe parsed for "483—too many hop errors" and analyzed for proper hop count (block 710) and an activity message may be logged (block 715). For example, I-SMHR 150 (e.g., SIP request error analyzer module 410) may categorize the frequency of the SIP error along with their source, destination, and the preconfigured hop count limit number found in the Max-Forwards field. I-SMHR 150 (e.g., hop count activity logger 450) may store the 483 error and may associate the 483 error with any other errors that may be stored in relation to the particular destination.

The network route table may be loaded, and the SIP setup paths may be optimized based on the new hop count (block 720) and the activity message may be logged (block 715). For example, I-SMHR 150 (e.g., hop count topology optimizer 420) may identify the required Max-Forwards value for the SIP session setup request and may assemble an optimal path table to track the optimal path from I-SMHR 150 to the destination. I-SMHR 150 (e.g., hop count activity logger 450) may store the optimized setup paths and may associate the optimized setup paths with the particular destination.

The optimal path route and hop count value may be received and the SIP session setup request may be forwarded (block 725) and the activity message may be logged (block 715). For example, I-SMHR 150 (e.g., hop count activation manager 430) may receive SIP session requests from hop count topology optimizer 420 with the appropriate Max-Forwards value and may process the SIP session setup request by forwarding the SIP session setup request to next SIP proxy. I-SMHR 150 (e.g., hop count activity logger 450) may record that the message was passed from hop count topology optimizer 420 to hop count activation manager 430 in relation to the particular destination.

The activation request may be received and sent to a corresponding SIP proxy server (block 730) and the activity message may be logged (block 715). For example, I-SMHR 150 (e.g., SIP proxy interface 440) may receive the SIP session setup request with the revised hop count from hop count activation manager 430 and may forward the SIP session setup request with the revised hop count to the next network element 140 along the optimal path of IMS SIP network 130. I-SMHR 150 (e.g., hop count activity logger 450) may record the forwarding in relation to the particular destination.

It may be determined whether a "483—too many hops error" is still occurring (block 735). For example, I-SMHR 150 (e.g., SIP request error analyzer module 410) may identify a new "483—too many hops error" received from a network element 140. If it is determined that a "483—too many hops error" is still occurring (block 735—YES), process 700 may return to block 705 to load additional error messages. For example, I-SMHR 150 (e.g., SIP request error analyzer module 410) may receive another SIP error message from an adjacent network element 140. If it is determined that a "483—too many hops error" is not still occurring (block 735—NO), the 483 error may be deemed corrected and the status result may be stored (block 740). For example, I-SMHR 150 (e.g., hop count topology optimizer 420) store the correct max-forwards value in table 500.

Systems and/or methods described herein may forward, in a network, a session setup request from an originating user device toward a destination user device, and may intercept a too many hops error message (e.g., a SIP 483 error) from a network element to the originating user device. The systems and/or methods may also automatically send, in response to the error message, a search request message to determine the correct number of hops from the originating user device to the destination user device, and may reset a Max-Forwards value for the session setup request based on the determined correct number of hops. The session setup request with the determined correct number of hops may be resent on behalf of the originating device without the too may hops error ever reaching the originating device. The systems and/or methods may be agnostic of the condition of the SIP network and any warning messages contained within the SIP 483 error response. The systems and/or methods may be deployed in any node within a SIP network. The systems and/or methods may periodically update a hop count table and may reserve at least one optimal SIP setup path on standby in case a failure occurs.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 6 and 7, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer device-implemented method, comprising:
   forwarding, in a Session Initiation Protocol (SIP) network and by the computer device, a session setup request from an originating user device toward a destination user device;
   intercepting, by the computer device, a too many hops error message from a network element and intended for the originating user device;
   automatically sending, in response to the intercepting and by the computer device, a search request message to determine a correct number of hops from the originating user device to the destination user device;
   resetting, by the computer device, a Max-Forwards value for the session setup request based on the determined correct number of hops; and
   resending, by the computer device, the session setup request, with the determined correct number of hops, on behalf of the originating device.

2. The computer device-implemented method of claim 1, further comprising:
   receiving a result of the search request message, the result indicating the correct number of hops to the destination user device;
   associating the result with an identifier for the destination user device; and
   storing the result of the search request message with the associated identifier for the destination user device.

3. The computer device-implemented method of claim 2, further comprising:
   receiving another session setup request for the destination user device;
   comparing a Max-Forwards value in the other session setup request to the stored result of the search request message; and
   resetting the Max-Forwards value for the other session setup request to the stored result of the search request message if the Max-Forwards value in the other session setup request is different than the stored result of the search request message.

4. The computer device-implemented method of claim 2, further comprising:
   receiving another session setup request for the destination user device; and
   resetting a Max-Forwards value for the other session setup request to the stored result of the search request message.

5. The computer device-implemented method of claim 2, where the stored result of the search request message is included in a data structure with stored results of other search request messages.

6. The computer device-implemented method of claim 2, further comprising:
   periodically updating the stored result of the search request message.

7. The computer device-implemented method of claim 1, where the network comprises an Internet Protocol (IP) Multimedia Subsystem (IMS) network.

8. The computer device-implemented method of claim 7, further comprising:
   receiving, at a first node in the network, the session setup request from the originating user device toward the destination user device.

9. The computer device-implemented method of claim 1, further comprising:
   identifying an optimal path for the session setup request;

associating the optimal path with an identifier for the destination user device; and storing the optimal path with the associated identifier for the destination user device.

10. A method, comprising:

receiving, at a network element in a network, a session setup request from an originating user device toward a destination user device;

comparing, by the network element, a Max-Forwards value in the session setup request to a stored Max-Forwards value associated with an indicator for the destination user device;

resetting, by the network element, the Max-Forwards value for the session setup request if the Max-Forwards value is different than the stored Max-Forwards value associated with an indicator for the destination user device; and forwarding, by the network element, the session setup request to a next hop in the network.

11. The method of claim 10, where the network comprises an Internet Protocol (IP) Multimedia Subsystem (IMS) network.

12. The method of claim 10, further comprising:

receiving, from the next hop, a too many hops error message to the originating user device;

sending, in response to the receiving, a search request message to determine a correct number of hops from the originating user device to the destination user device; and updating the stored Max-Forwards value associated with the indicator for the destination user device.

13. The method of claim 10, further comprising:

sending a periodic ping request to update the stored Max-Forwards value associated with the indicator for the destination user device.

14. A device, comprising:

a memory to store a plurality of instructions; and a processor to execute instructions in the memory to:

receive a session setup request from an originating user device, forward, over a network, the session setup request toward a destination user device, intercept a response to the originating user device, the response including a too many hops error message, send, over the network and in response to the intercepted response, a search request message to determine a correct number of hops from the originating user device to the destination user device, reset a Max-Forwards value for the session setup request based on the determined correct number of hops, and resend the session setup request with the reset Max-Forwards value on behalf of the originating device.

15. The method of claim 14, where the processor is further to:

receive a result of the search request message, the result indicating the correct number of hops to the destination user device, associate the result with an identifier for the destination user device, and store the result of the search request message with the associated identifier for the destination user device.

16. The method of claim 15, where the processor is further to:

receive another session setup request for the destination user device, compare a Max-Forwards value in the other session setup request to the stored result of the search request message, and reset the Max-Forwards value for the other session setup request if the Max-Forwards value in the other session setup request is different than the stored result of the search request message.

17. The method of claim 15, where the processor is further to:

periodically update the stored result of the search request message.

18. The method of claim 14, where the network comprises an Internet Protocol (IP) Multimedia Subsystem (IMS) network.

19. A system comprising:

means for receiving a Session Initiation Protocol (SIP) session setup request from an originating user device;

means for forwarding the SIP session setup request toward a destination user device;

means for intercepting a SIP response, including a too many hops error message, from a network element to the originating user device;

means for automatically sending, in response to the SIP response, a request message to determine the correct number of hops from the originating user device to the destination user device;

means for receiving a reply to identify a correct number of hops for an optimal path to the destination user device;

means for resetting a max hop count value for the session setup request based on the determined correct number of hops; and means for resending the session setup request, toward the destination user device, with the determined correct number of hops on behalf of the originating device.

20. The method of claim 19, where the network comprises an Internet Protocol (IP) Multimedia Subsystem (IMS) network.

* * * * *